United States Patent [19]
Nass et al.

[11] Patent Number: 6,051,646
[45] Date of Patent: Apr. 18, 2000

[54] THERMOSETTING BINDER PREPARED WITH (HYDROXYALKYL)UREA CROSSLINKING AGENT FOR ABRASIVE ARTICLES

[75] Inventors: David R. Nass, Bridgewater, N.J.; Andrew J. Kielbania, Jr., Chalfont, Pa.; Sharon P. Lee, Metuchen, N.J.

[73] Assignee: National Starch and Chemical Investment Holding Corporation, Wilmington, Del.

[21] Appl. No.: 09/181,192

[22] Filed: Oct. 28, 1998

Related U.S. Application Data

[63] Continuation-in-part of application No. 08/783,350, Jan. 7, 1997, Pat. No. 5,858,549.

[51] Int. Cl.$^7$ .............. B32B 19/02; C08K 3/14; C08L 31/04; C08L 33/02; C08L 29/04
[52] U.S. Cl. .............. 524/556; 51/294; 51/295; 51/298; 428/283; 523/157; 524/443; 524/504; 524/506; 524/507; 524/513; 524/517; 524/522; 524/523; 524/524; 524/548; 524/557; 524/560; 524/561; 524/564; 524/601; 524/602
[58] Field of Search .............. 428/474.4, 482, 428/283; 525/418, 424, 452, 540; 51/294, 295, 298; 524/443, 504, 506, 507, 513, 517, 522, 523, 524, 548, 556, 557, 560, 561, 563, 601, 602, 564; 523/157

[56] References Cited

U.S. PATENT DOCUMENTS

| | | | |
|---|---|---|---|
| Re. 34,092 | 10/1992 | Henry | 523/143 |
| 3,965,072 | 6/1976 | Markiewitz | 260/77.5 C |
| 4,076,673 | 2/1978 | Swift et al. | 526/49 |
| 4,101,606 | 7/1978 | Cenci et al. | 260/857 UN |
| 4,115,637 | 9/1978 | Cenci et al. | 526/36 |
| 4,138,541 | 2/1979 | Cenci et al. | 526/303 |
| 4,203,900 | 5/1980 | Kaiser | 548/239 |
| 4,209,607 | 6/1980 | Shalaby et al. | 528/291 |
| 4,293,669 | 10/1981 | Rottmaier et al. | 525/452 |
| 4,443,490 | 4/1984 | Nakajima et al. | 427/44 |
| 4,482,659 | 11/1984 | Sanjana et al. | 523/414 |
| 4,546,121 | 10/1985 | Hass et al. | 521/164 |
| 4,608,419 | 8/1986 | Dorman et al. | 525/329.9 |
| 4,626,575 | 12/1986 | Goel | 525/329.5 |
| 4,677,167 | 6/1987 | Goel | 525/375 |
| 4,705,885 | 11/1987 | Just et al. | 560/158 |
| 4,708,984 | 11/1987 | Forgione et al. | 525/127 |
| 4,727,111 | 2/1988 | Pettit, Jr. et al. | 525/190 |
| 4,761,457 | 8/1988 | Arita et al. | 525/439 |
| 4,785,070 | 11/1988 | Rasmussen et al. | 528/73 |
| 4,788,255 | 11/1988 | Pettit, Jr. et al. | 525/131 |
| 4,801,680 | 1/1989 | Geary et al. | 528/272 |
| 4,889,890 | 12/1989 | Kerr et al. | 525/113 |
| 4,937,288 | 6/1990 | Pettit, Jr. et al. | 525/176 |
| 4,988,767 | 1/1991 | Pettit, Jr. | 525/194 |
| 4,990,579 | 2/1991 | Paar | 525/528 |
| 5,006,622 | 4/1991 | Kunzler et al. | 526/309 |
| 5,013,791 | 5/1991 | Kerr et al. | 525/113 |
| 5,039,759 | 8/1991 | Hoy et al. | 525/437 |
| 5,098,955 | 3/1992 | Pettit, Jr. | 525/194 |
| 5,124,421 | 6/1992 | Ulbrich et al. | 526/212 |
| 5,130,479 | 7/1992 | Ulbrich et al. | 562/874 |
| 5,143,582 | 9/1992 | Arkens et al. | 162/135 |
| 5,169,880 | 12/1992 | Yoshida et al. | 523/145 |
| 5,182,337 | 1/1993 | Pettit, Jr. et al. | 525/176 |
| 5,189,079 | 2/1993 | Geoffrey et al. | 523/142 |
| 5,190,993 | 3/1993 | Iyer | 523/145 |
| 5,214,101 | 5/1993 | Pettit, Jr. et al. | 525/176 |
| 5,234,973 | 8/1993 | Iyer et al. | 523/145 |
| 5,238,976 | 8/1993 | Iyer | 523/145 |
| 5,266,628 | 11/1993 | Essary et al. | 524/336 |
| 5,292,807 | 3/1994 | Schafer et al. | 525/113 |
| 5,318,990 | 6/1994 | Strauss | 524/549 |
| 5,340,868 | 8/1994 | Strauss et al. | 524/461 |
| 5,346,947 | 9/1994 | Guerro et al. | 524/591 |
| 5,354,788 | 10/1994 | Johnson et al. | 523/145 |
| 5,360,876 | 11/1994 | Burgoyne, Jr. et al. | 525/374 |
| 5,395,911 | 3/1995 | Frings et al. | 528/87 |
| 5,397,369 | 3/1995 | Ohishi | 51/295 |
| 5,427,587 | 6/1995 | Arkens et al. | 8/116.1 |
| 5,451,446 | 9/1995 | Kincaid et al. | 428/143 |
| 5,455,287 | 10/1995 | Carpenter et al. | 523/143 |
| 5,516,859 | 5/1996 | Dunnavant et al. | 525/504 |
| 5,529,666 | 6/1996 | Yesnik | 162/136 |
| 5,536,766 | 7/1996 | Seyffer et al. | 524/100 |
| 5,551,961 | 9/1996 | Engen et al. | 51/298 |
| 5,567,743 | 10/1996 | Busby et al. | 523/143 |
| 5,591,239 | 1/1997 | Larson et al. | 51/294 |
| 5,602,192 | 2/1997 | Yoshida et al. | 523/145 |
| 5,612,393 | 3/1997 | Arakawa et al. | 523/145 |
| 5,639,804 | 6/1997 | Yesnik | 523/156 |
| 5,646,199 | 7/1997 | Yoshida et al. | 123/139 |
| 5,676,577 | 10/1997 | Lam et al. | 442/60 |
| 5,688,857 | 11/1997 | Chen et al. | 524/590 |
| 5,713,968 | 2/1998 | Fruitman et al. | 51/296 |
| 5,733,952 | 3/1998 | Geoffrey | 523/143 |
| 5,753,018 | 5/1998 | Lamport et al. | 106/36 |

FOREIGN PATENT DOCUMENTS

| | | |
|---|---|---|
| 0 469 785 A2 | 2/1992 | European Pat. Off. . |
| 0 471 409 A1 | 2/1992 | European Pat. Off. . |
| 0 583 086 A1 | 2/1994 | European Pat. Off. . |
| 0 651 088 A1 | 5/1995 | European Pat. Off. . |
| 1 466 996 | 2/1969 | Germany . |
| 5-148429 | 3/1991 | Japan . |
| WO 94/03545 | 2/1994 | WIPO . |
| WO 94/11451 | 5/1994 | WIPO . |

OTHER PUBLICATIONS

H. S. Kim and J. S. Huh, "Role of ceramic fillers in the friction and wear behaviour of phenolics resin composites", *Journal of Materials Science Letters* 17 (1998) 501–502.

Gopal et al., "Tribological Study of Non–Asbestos Fiber Reinforced Phenolic Composites for Braking Applications", Mechanical Behavior I, 106–113.

*Primary Examiner*—Robert E. Sellers
*Attorney, Agent, or Firm*—John D. Thallemer

[57] ABSTRACT

Abrasive articles comprising a cured thermosetting binder and abrasive grains. The binder is prepared with a polyfunctional molecule which contains at least two functional groups selected from the group consisting of carboxyl, anhydride and amine, and a (hydroxyalkyl)urea crosslinking agent containing a single urea group, at least two hydroxyl groups, and have at least two carbon atoms disposed between the urea group and each of the hydroxyl groups. The abrasive articles comprise bonded, nonwoven or coated abrasive articles.

11 Claims, 5 Drawing Sheets

6,051,646

THERMOSETTING BINDER PREPARED WITH (HYDROXYALKYL)UREA CROSSLINKING AGENT FOR ABRASIVE ARTICLES

CROSS-REFERENCE TO RELATED APPLICATIONS

This application is a continuation-in-part of application Ser. No. 08/783,350 filed Jan. 7, 1997, U.S. Pat. No. 5,858,549.

FIELD OF THE INVENTION

The present invention relates to an abrasive articles prepared with abrasive grains and a binder prepared with a (hydroxyalkyl)urea crosslinking agent.

BACKGROUND OF THE INVENTION

Synthetic polymers are used in a wide variety of applications. In many applications, these synthetic polymers are crosslinked in order to achieve the required performance properties. For over 60 years, a large class of commercially important thermoset polymers have utilized formaldehyde-based crosslinking agents. Such crosslinking agents based on formaldehyde traditionally have provided an efficient and cost-effective means of curing a wide variety of materials. Examples of formaldehyde-based crosslinking agents include melamine-formaldehyde, urea-formaldehyde, phenol-formaldehyde and acrylamide-formaldehyde adducts. With growing toxicity and environmental concerns, there has been an ongoing search to replace formaldehyde-based crosslinking agents. However, these alternative crosslinkers have suffered from significant deficiencies including low or slow cure, requiring end uses to change their commercial high speed application equipment, emission of toxic components or volatile organic compounds other than formaldehyde.

A particularly attractive crosslinking reaction involves the esterification of a carboxylic acid functional polymer with a hydroxyl functional polymer. This is an attractive reaction since water is the only product of the crosslinking reaction. However, for polymeric systems, this reaction is difficult to conduct effectively since it is slow under conventional time and temperature conditions of cure. Raising the temperature to force this curing reaction results in unacceptable color development and/or degradation, with the emission of unwanted volatile organic compounds.

β-Hydroxyalkyl amide functionality was developed to facilitate the esterification crosslinking of carboxylic acid containing polymers. However, this technology still is deficient in crosslinking rate and crosslinking densities under conditions typically used for formaldehyde based crosslinking agents. In addition to the high temperature and long curing time requirements for crosslinking, the use of a catalyst is only marginally effective in accelerating the reaction of β-hydroxyl amides.

To address this unfilled need for a robust formaldehyde-free crosslinker, we have found unexpectedly that (hydroxyalkyl)urea derivatives result in facile and safe crosslinking of di- and/or poly-functionalized molecules and polymers, as described herein below.

SUMMARY OF THE INVENTION

The present invention relates to abrasive articles comprising a cured thermosetting binder and abrasive grains. The binder is prepared with a poly-functional molecule which contains at least two functional groups selected from the group consisting of carboxyl, anhydride and amine, and a (hydroxyalkyl)urea crosslinking agent containing a single urea group, at least two hydroxyl groups, and having at least two carbon atoms disposed between the urea group and each of the hydroxyl groups.

The abrasive articles comprise bonded, nonwoven or coated abrasive articles. In the case of a bonded abrasive, the cured thermosetting binder bonds abrasive grains together to form a shaped mass. In the case of a coated abrasive, the cured thermosetting binder holds and supports the abrasive grains on a backing sheet. In the case of a nonwoven abrasive, the cured thermosetting binder holds and supports the abrasive grains in a fibrous sheet.

According to another embodiment of the invention, the abrasive article is an open low-density abrasive article, comprising in combination (a) a lofty, open, nonwoven three-dimensional fibrous web comprising a plurality of interentangled randomly-extending polyamide staple fibers including points of intersection and contact between said fibers, said points of intersection and contact between said fibers being bonded together to form a three-dimensionally integrated structure throughout said wed, wherein said fibers have surfaces and a fiber tenacity of less than 5 g/denier; (b) a plurality of abrasive particles dispersed throughout said web and securely adhered to said surface of said fibers; and (c) a cured thermosetting binder composition dispersed throughout said web, said binder composition comprising a poly-functional molecule comprising at least two functional groups selected from the group consisting of carboxyl, anhydride and amine; and a crosslinking agent present in amounts effective to provide crosslinked compositions, said crosslinking agent comprising a single urea group and at least two hydroxyl groups, wherein at least two carbon atoms are disposed between the urea group and each of the hydroxyl groups.

According to another embodiment of the invention, the thermosetting binder of the invention is useful as a friction material such as an asbestos substitute. Suitable applications include drum linings, disc brake pads, brake shoes, clutch plates, transmission bands, synchronizer rings, friction disks, and brake blocks in drilling rigs. The binders of the invention when cured and combined with abrasive grains exhibit a high friction coefficient, excellent thermal stability, long lifetime, no noise, and reliable strength.

In another embodiment, the resin of the invention is useful to bond an aggregate such as foundry sand to form a foundry core or mold as is known in the art, in order to provide easy shakeout.

In another embodiment, the resin of the invention provides an abrasive foam grinding, honing, and buffing material. The resin of the invention is combined with microballoons to produce an abrasive stone pad for use in processing workpiece surfaces such as computer hard disks.

DESCRIPTION OF THE INVENTION

Figure 1:
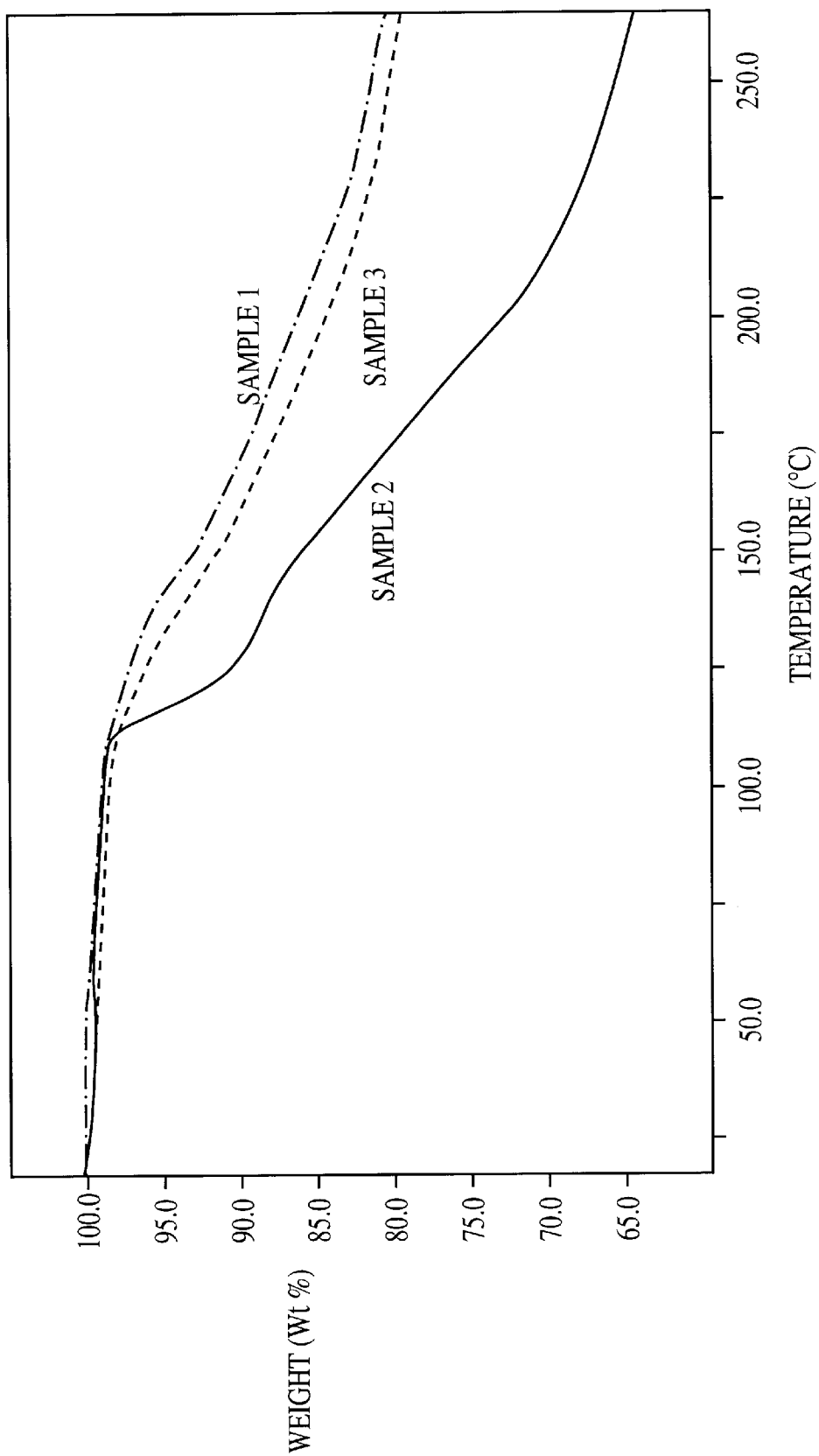
FIG. 1 is a thermogravimetric analysis (TGA) thermogram comparing crosslinking properties of (hydroxyalkyl) urea (HAU) crosslinking agents to hydroxyalkyl amide (HAA) crosslinking agents.

This invention relates to abrasive articles comprising a cured thermosetting binder and abrasive grains. The binder is prepared with a poly-functional molecule (PFM) which contains at least two functional groups selected from the group consisting of carboxyl, anhydride and amine, and a (hydroxyalkyl)urea (HAU) crosslinking agent containing a single urea group, at least two hydroxyl groups, and have at least two carbon atoms disposed between the urea group and each of the hydroxyl groups.

As used herein, the following terms are defined as:

"abrasive articles" means bonded abrasive articles, coated abrasive articles, and nonwoven abrasive articles;

"nonwoven" in reference to an open low density abrasion article means a web or batt of random or directional fibers held together through mechanical, chemical, or physical methods, or any combination of these, but excluding weaving, knitting, stitching, traditional felting, as well as conventionally formed paper;

"low density" in reference to a nonwoven web in an open low density abrasion article means an extremely open structure having an extremely high void volume;

"open" as used in reference to a nonwoven web in an open low density abrasion article means that web thickness of about one-fourth inch (6 mm) are highly translucent or transparent when held up to light;

As used herein, the term "molecule" means non-polymeric molecules, low molecular weight polymers or oligomers, for instance having molecular weight of less than about 10,000, and higher molecular weight polymers, for instance having molecular weight of greater than about 10,000 to greater than 1,000,000. The actual molecular weight of the molecule is not a limiting factor with respect to the use of the crosslinking agents.

The PFM must contain at least two functional groups selected from the group consisting of carboxyl, anhydride and amine. Exemplary molecules which may be used in the present invention include without limitation citric acid, 1,2,4-benzene tricarboxylic acid, 1,2,4,5-benzene tetracarboxylic acid, 1,2,3,4-butane tetracarboxylic acid, poly (acrylic acid), carboxylic-acid-functionalized polyesters, carboxylic-acid-functionalized polyurethanes, polyethylenimine, poly(vinyl amine-covinyl alcohol), poly (vinyl amines) and polymers prepared from monomers such as ethylene (E), vinyl acetate (VA), (meth)acrylic acid (M)AA, the $C_1$–$C_8$ alkyl esters of (meth)acrylic acid, maleic anhydride (MAnh), maleic acid, itaconic acid (IA), crotonic acid (CA), β-carboxy ethyl acrylate (BCEA), butadiene and styrene (STY). (Meth)acrylic is used herein to denote both acrylic and methacrylic acids and esters thereof. Exemplary copolymers include ethylene/vinyl acetate/acrylic acid copolymers, vinyl acetate/acrylic acid copolymers, acrylic acid/maleic anhydride copolymers, vinyl acetate/acrylic acid/maleic anhydride copolymers, ethylene/acrylic acid copolymers, ethylene/methacrylic acid copolymers, ethylene/vinyl acetate/acrylic acid/maleic anhydride copolymers, vinyl acetate/maleic anhydride copolymers, ethylene/vinyl acetate/maleic anhydride copolymers, methyl methacrylate/butyl acrylate/acrylic acid copolymers, methyl methacrylate/ethyl acrylate/acrylic acid copolymers, methyl methacrylate/butyl acrylate/itaconic acid copolymers, butyl acrylate/acrylic acid copolymers, butyl acrylate/BCEA copolymers, ethyl acrylate/acrylic acid copolymers, 2-ethylhexyl acrylate/acrylic acid copolymers, methyl methacrylate/ethyl (meth)acrylate/itaconic acid copolymers, styrene/(meth)acrylic acid copolymers, styrene/maleic anhydride copolymers, styrene/(meth)acrylic acid/maleic anhydride copolymers, styrene/itaconic acid copolymers and styrene/butadiene copolymers. Additionally, polymers comprising anhydride groups may be generated in situ during preparation of poly(acrylic acid). These examples are not limiting and the (hydroxyalkyl)urea crosslinking agents according to the present invention may be used to crosslink virtually any molecule which comprises at least two functional groups selected from the group consisting of carboxyl, amine and anhydride. The (hydroxyalkyl)urea crosslinking agent is very versatile and may be used easily to crosslink aqueous solution polymers, organic solution polymers, polymer melts, emulsion polymers, aqueous and non-aqueous dispersions of polymers, and powders.

The crosslinking agents are derived from urea, comprise only a single urea group, at least two hydroxyl groups, at least two carbon atoms disposed between the urea group and each of the hydroxyl groups, and may include any of those compounds represented by Structure (I). The two carbons disposed between the hydroxyl and urea groups may be in linear, branched or substituted configuration.

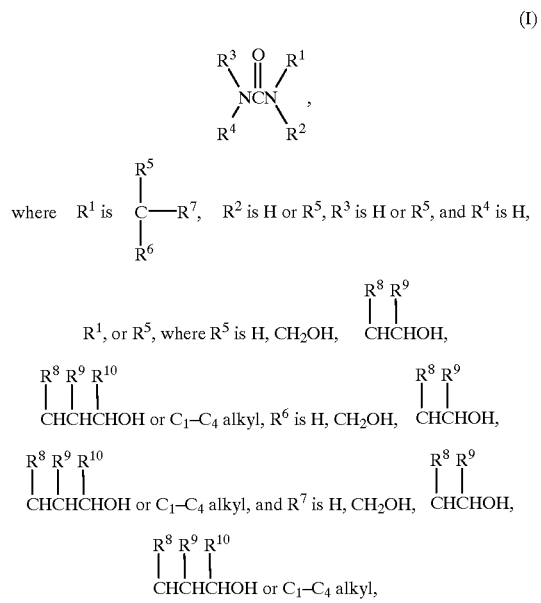

where $R^8$ is H, methyl or ethyl, $R^9$ is H, methyl or ethyl, and $R^{10}$ is H, methyl or ethyl.

Exemplary HAU crosslinkers include, without limitation, N,N-bis(2-hydroxyethyl)urea, tetrakis(2-hydroxyethyl)urea, tris(2-hydroxyethyl)urea, N,N'-bis(2-hydroxyethyl)urea, N,N'-bis(3-hydroxypropyl)urea, N,N'-bis(4-hydroxybutyl) urea and 2-urea-2-ethyl-1,3-propanediol. The terms "crosslinking agent" and "crosslinker" are used interchangeably herein.

In certain embodiments of the invention, the PFM may be generated in situ from starting molecules which do not comprise at least two functional groups selected from the group consisting of carboxyl, anhydride and amine. When the starting molecules and the HAU crosslinkers are combined under certain conditions effective to induce crosslinking, functional groups will be generated such that the molecules comprise at least two functional groups selected from the group consisting of carboxyl, anhydride and amine. The functional groups may be generated in situ by the addition of heat to the system or by chemical reaction with the starting molecules, for example, acid catalyzed hydrolysis of alkyl esters such as methyl or t-butyl, are very facile in generating carboxylic acid. Other mechanisms of generating functional groups in situ will be readily apparent to those skilled in the art once having the benefit of the teachings contained herein.

It surprisingly was noted that when a HAU crosslinker is compared to other crosslinkers which contain at least two hydroxyl groups, the HAU systems exhibited dramatic improvement in crosslinking uncatalyzed systems, i.e., systems which comprise the PFM and the crosslinker, but do not contain a catalyst. For example, in Table 5a herein, HAU, HAA and glycerol, all containing two or more hydroxyl groups, are used to crosslink poly(acrylic acid). In uncatalyzed systems, the percent insolubles of the three systems are 42%, 3% and 0%, respectively, indicating that the urea group in combination with the two hydroxyl groups is critical in achieving desired crosslinking properties and that merely using a crosslinker with at least two hydroxy groups is not sufficient to realize the benefits afforded by the present invention. When the HAU and the HAA are used independently in combination with a catalyst such as sodium hypophosphite, the percent insolubles are 52% and 51%, respectively. The data indicate that the HAU crosslinkers possess synergism in that they perform well as crosslinkers both in catalyzed and uncatalyzed systems, while it has been reported in the literature that other polyol crosslinkers which comprise at least two hydroxyl groups must be used in combination with a phosphorus-containing catalyst to achieve crosslinking properties which approach those of the HAU crosslinkers. Specifically, EP patent application 0 583 086 teaches that in order for the crosslinkers disclosed therein to be effective, they must be used in combination with a catalyst that contains phosphorus, as opposed to any class of catalyst. Accordingly, if any comparison is to be made between the HAU crosslinkers of the present invention and the HAA crosslinkers reported in the EP patent application, the fact that the HAU crosslinkers work in systems which are catalyzed with catalysts which do not contain phosphoros is unexpected. The fact that the HAU crosslinkers work at all in uncatalyzed systems is particularly surprising in view of the teachings of EP 0 583 086.

Furthermore, it surprisingly was found that the HAU crosslinking agents according to the present invention significantly enhance the crosslinking reaction rate, and thus the crosslinking efficiency, when compared to hydroxyalkyl amides (HAA) which may be used to crosslink molecules comprising at least two functional groups selected from carboxyl, amine and anhydride. This accelerated crosslinking may be observed by conducting thermogravimetric analysis (TGA).

FIG. 1 is a thermogram comparing poly(acrylic acid) cured with bis[N,N-di(beta-hydroxyethyl)]adipamide (HAA crosslinker, Sample 1) to the same poly(acrylic acid) cured with N,N-bis(2-hydroxyethyl)urea (HAU crosslinker, Sample 2). Sample 3 is the same HAA crosslinker which has been catalyzed with a phosphorus-containing catalyst. The cure can be followed by the weight loss due to the release of water which is a byproduct of the cure.

Figure 2:
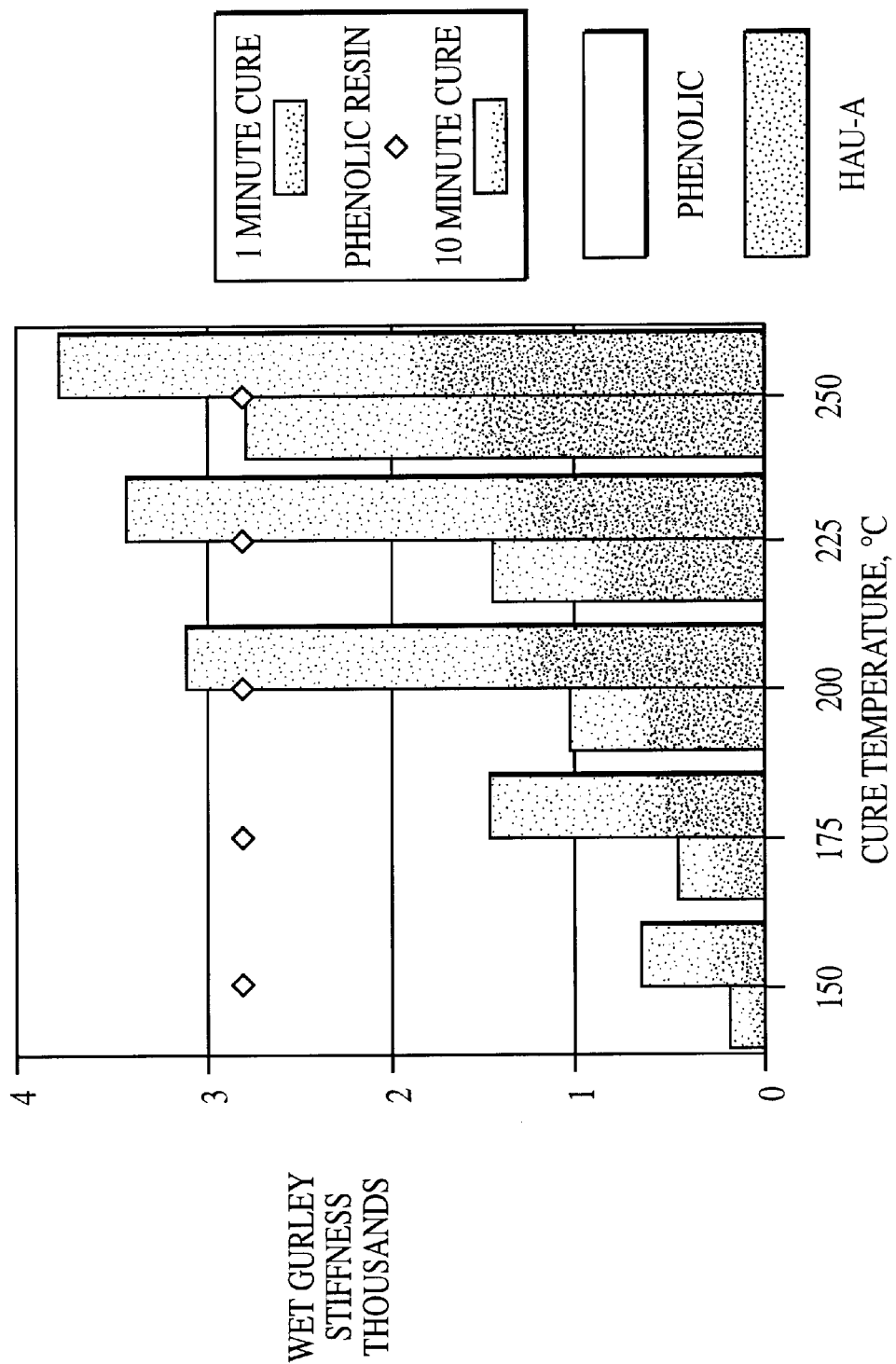
FIG. 2 is a graph illustrating the effect of cure temperature on wet gurley stiffness for a phenolic resin and the hydroxyalkyl urea resin of the invention.

FIG. 2 is a graph illustrating the effect of cure temperature on wet Gurley Stiffness for a phenolic resin and the hydroxyalkyl urea resin of the invention. The results show the difference in wet stiffness between 1 and 10 minutes. Cure temperature has an equal impact. The break point occurs between 175 and 200° C.

Figure 3:
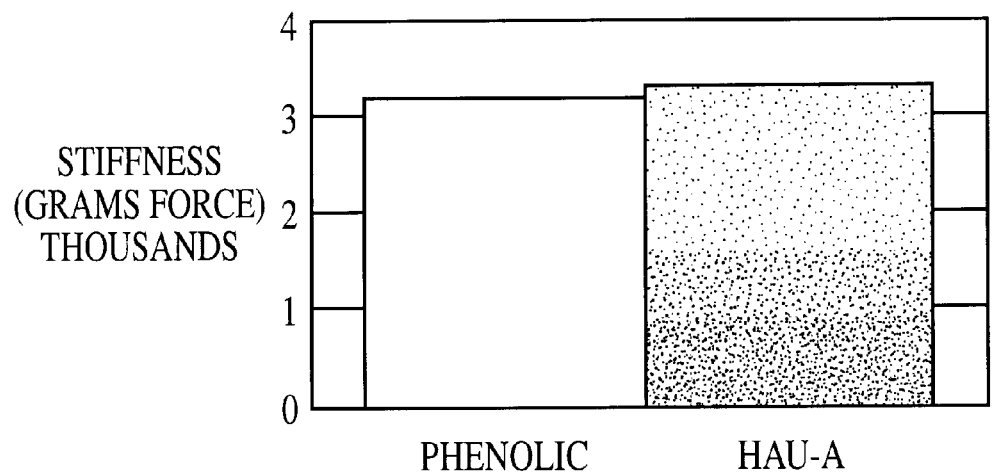
FIG. 3 is a graph comparing wet Gurley Stiffness results on glass fiber for a phenolic resin and the hydroxyalkyl urea resin of the invention.

FIG. 3 is a graph comparing wet Gurley Stiffness results on glass fiber for a phenolic resin and the hydroxyalkyl urea resin of the invention. Testing was conducted on saturated and fully cured Whatman GF/B fiberglass filter paper with 20% binder pick up.

Figure 4:
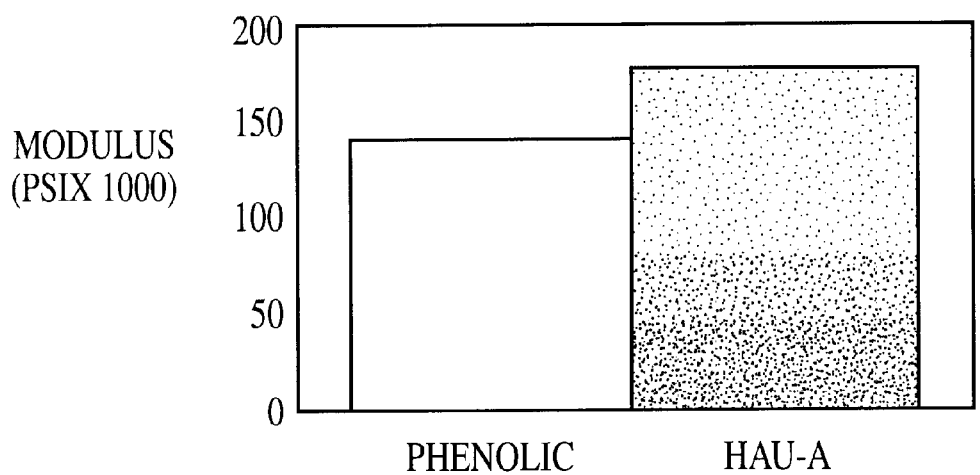
FIG. 4 is a graph comparing Young's Modulus results on glass fiber for a phenolic resin and the hydroxyalkyl urea resin of the invention.

FIG. 4 is a graph comparing Young's Modulus results on glass fiber for a phenolic resin and the hydroxyalkyl urea resin of the invention. Testing was conducted on saturated and fully cured Whatman GF/B fiberglass filter paper with 20% binder pick up. When fully cured, the HAU resin of the invention exhibits higher modulus than phenolic resin when applied to the fiberglass substrate.

Figure 5:
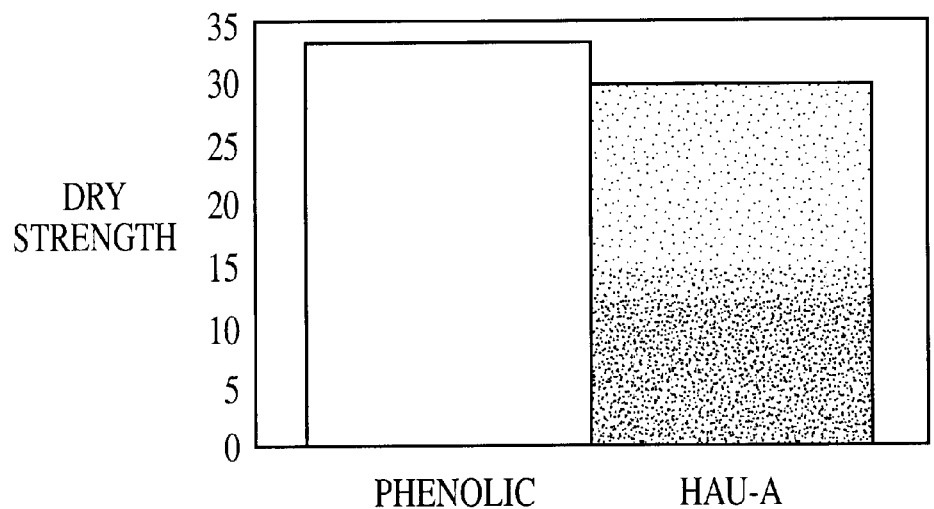
FIG. 5 is a graph comparing tensile strength results on cellulose fiber for a phenolic resin and the hydroxyalkyl urea resin of the invention.

FIG. 5 is a graph comparing tensile strength results on cellulose fiber for a phenolic resin and the hydroxyalkyl urea resin of the invention. Testing was conducted on saturated and fully cured Whatman GF/B fiberglass filter paper with 20% binder pick up. The results show that dry tensile performance of the HAU resin of the invention is similar to phenolic resin.

Figure 6:
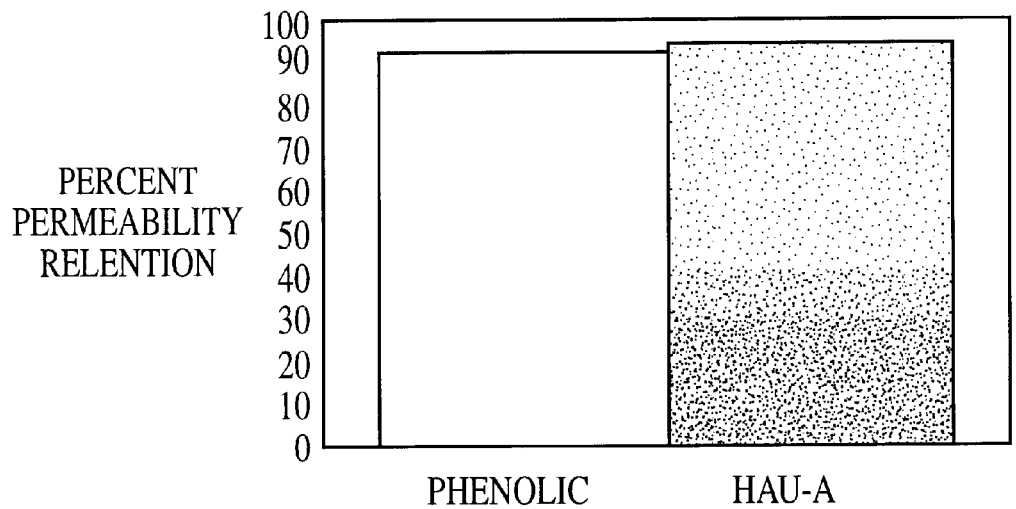
FIG. 6 is a graph comparing air permeability loss due to saturation results on a cellulose fiber for a phenolic resin and the hydroxyalkyl urea resin of the invention.

FIG. 6 is a graph comparing air permeability loss due to saturation results on a cellulose fiber for a phenolic resin and the hydroxyalkyl urea resin of the invention. Testing was conducted on saturated and fully cured Whatman GF/B fiberglass filter paper with 20% binder pick up. The HAU resin is in an aqueous solution. Fiber wet out was rapid and uniform, thus reduction in web permeability is minimum when compared to phenolic emulsion polymer.

Figure 7:
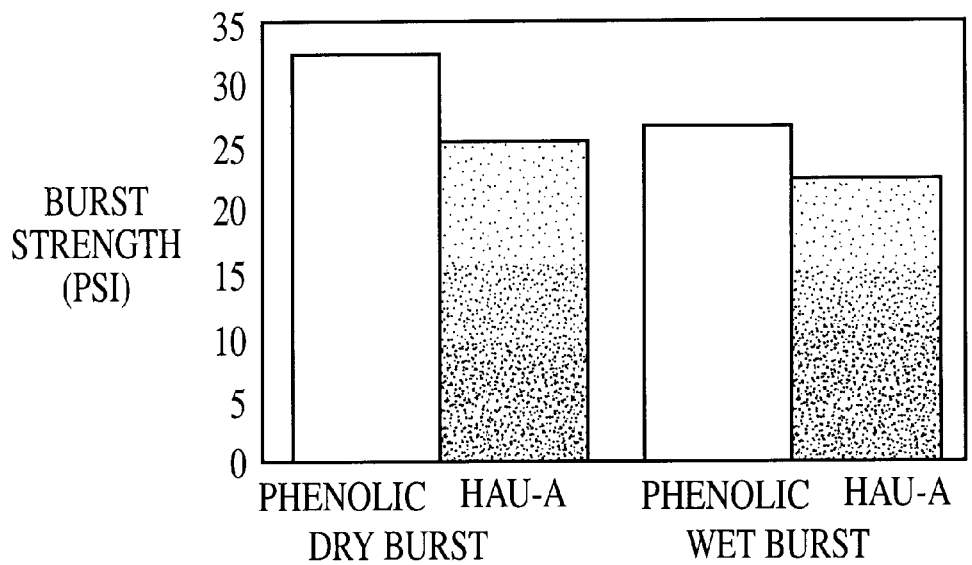
FIG. 7 is a graph comparing Mullen Burst results on cellulose fiber for a phenolic resin and the hydroxyalkyl urea resin of the invention.

FIG. 7 is a graph comparing Mullen Burst results on cellulose fiber for a phenolic resin and the hydroxyalkyl urea resin of the invention. Testing was conducted on saturated and fully cured Whatman GF/B fiberglass filter paper with 20% binder pick up. The HAU resin of the invention burst values are lower than papers saturated with phenolic resin. The percent retention of the dry burst when wet is the same for both thermosets.

Figure 8:
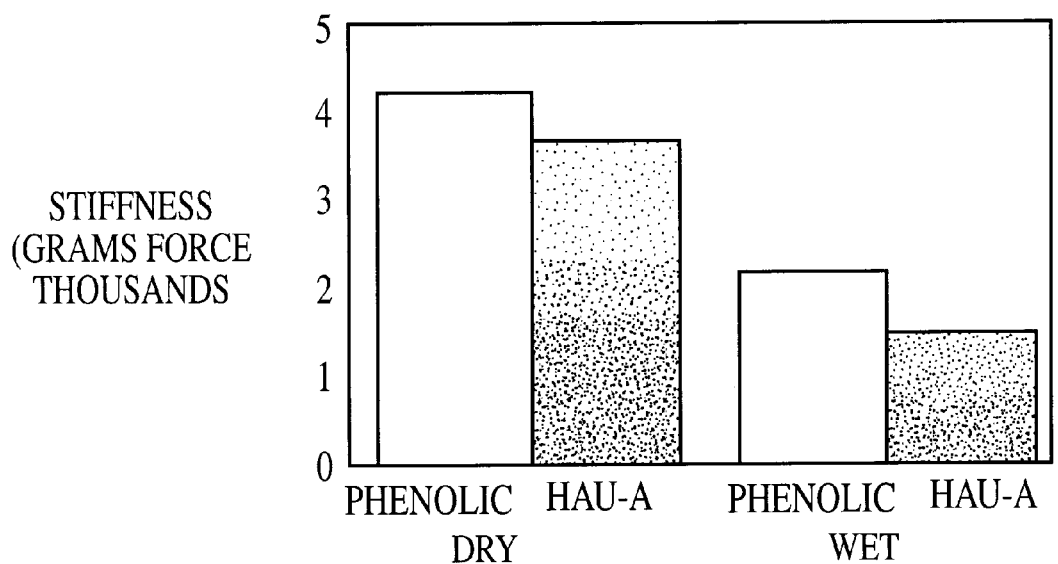
FIG. 8 is a graph comparing Gurley Stiffness results on a cellulose fiber for a phenolic resin and the hydroxyalkyl urea resin of the invention.

FIG. 8 is a graph comparing Gurley Stiffness results on a cellulose fiber for a phenolic resin and the hydroxyalkyl urea resin of the invention. Testing was conducted on saturated and fully cured Whatman GF/B fiberglass filter paper with 20% binder pick up. The HAU resin of the invention is rigid when cured. The increased flexibility compared to phenolic resin may preclude the use of modifiers commonly used with phenolic to eliminate brittleness.

HAU-A as used in the illustrations of FIGS. 2 to 8 is N,N-bis(2-hydroxyethyl) urea.

As noted, the catalyst improved the performance of the HAA crosslinker. Of particular note is the fact that the "uncatalyzed" HAU crosslinker (Sample 2) was much more efficient than the "catalyzed" HAA crosslinker (Sample 3). Furthermore, the degree of improvement of the uncatalyzed HAU crosslinker over the uncatalyzed HAA crosslinker was significantly greater than the degree of improvement of the "catalyzed" HAA crosslinker (Sample 3) over the uncatalyzed HAA crosslinker. The data clearly show that the HAU crosslinker is significantly more efficient than the HAA crosslinker with respect to the rate of cure. Based on the results of the TGA, films crosslinked with HAA and films crosslinked with HAU were cured in the TGA isothermally for 5 minutes at 120° C. The HAA-crosslinked film was 40 percent insoluble in water, compared to the HAU-crosslinked film which was 85 percent insoluble. This again indicates that HAU crosslinkers are significantly more efficient at crosslinking molecules according to the present invention than are HAA crosslinkers. Sample 3 in FIG. 1 is the same poly(acrylic acid) crosslinked with HAA and further using a phosphorus-containing catalyst. As observed, the use of a catalyst does improve crosslinking.

The relative degree of crosslinking generated by HAU and HAA crosslinking agents may be observed by measuring the water and solvent resistance of the crosslinked molecule (via the determination of percent insolubles). As observed in Table 5, poly(acrylic acid) Mw 90,000 was crosslinked both with HAU and HAA crosslinkers by curing at 240° C. for ten minutes. With respect to the degree of crosslinking, the HAU crosslinker was as efficient or better than the HAA crosslinkers (92% insolubles (HAU) vs. 91% and 74% insolubles, (HAA)s respectively).

The PFM and the HAU crosslinking agent will be present in relative amounts such that the ratio of the sum total number of equivalents of the functional groups contained in the PFM to the number of equivalents of the hydroxyl groups contained in the HAU crosslinker ranges from about 1:1 to about 100:1. Preferably, the ratio of the sum total number of equivalents of the functional groups contained in the PFM to the number of equivalents of the hydroxyl groups contained in the HAU crosslinker ranges from about 5:4 to about 10:1.

In certain embodiments of the present invention, Lewis acid and Lewis base catalysts may be used in combination with the crosslinking agent in order to further enhance crosslinking. Such catalysts generally include clays, silica, including without limitation colloidal silica, organic amines, quaternized-amines, metal oxides, metal sulfates, metal chlorides, urea sulfate, urea chloride and silicate-based catalysts. Exemplary Lewis acid and Lewis base catalysts which may be used in the invention are set forth in Table 11. Phosphorus-containing catalysts may be used in the present invention, including without limitation alkali metal hypophosphite salts, alkali metal phosphites, alkali metal polyphosphates, alkali metal dihydrogen phosphates, polyphosphoric acid and alkyl phosphinic acids. Such catalysts, when used, are used in less than stoichiometric amounts as the maximum level allowed, and in minimum amounts effective to improve crosslinking compared to a non-catalyzed, crosslinked composition. Each of the "catalyzed", crosslinked compositions of the invention exhibited significant increase in crosslinking when compared to a non-catalyzed, crosslinked composition of the invention, as evidence by the increase in insolubles noted in Table 11.

The thermosetting binder compositions of the invention may optionally comprise additives that are commonly used in abrasive articles. Such additives include toughening agents, fillers, fibers, lubricants, grinding aids, wetting agents, surfactants, pigments, dyes, coupling agents, plasticizers, thermoplastics, such as polyetherimides, and suspending agents. Combinations of additives may also be used. A preferred additive is a toughening agent in an amount up to about 30 weight percent of the binder composition. An example of a toughening agent is an elastomeric polymer or elastomeric oligomer. Useful toughening agents also include carboxylated acrylonitrile/butadiene vulcanizable elastomers, isocyanate-functional polyethers, and functional acrylic rubbers including acrylic core/shell materials and core/shell polymers such as methacrylate-butadiene copolymers. The amount of additives is selected to yield an abrasive article having the desired abrasive properties.

It is preferred to add a filler and/or grinding aid to the binder composition. Fillers and grinding aids are typically inorganic particles having particle sizes ranging from about 1 to about 50 micrometers. The fillers can be selected from any filler material which does not adversely affect the characteristics of the cured binder. Examples of preferred fillers are calcium carbonate, silica, and calcium metasilicate. Examples of preferred grinding aids are cryolite, and potassium tetrafluoroborate.

During the manufacture of an abrasive article, the HAU and PFM are combined under conditions effective to induce crosslinking of the PFM. Such conditions permit water to be removed from the system, thereby inducing crosslinking of the PFM. These conditions may be provided by adjusting temperature and/or pressure. For example, it is advantageous to cure the compositions at temperatures around 100° C., preferably greater than 100° C., more preferably about 200° C., in order to drive off water from the system. In fact, one of the advantages of the crosslinkers of the present invention is that they are stable at elevated temperatures and therefore work particularly well in systems which must be cured at temperatures greater than 100° C. Curing may occur at pressures where water may be removed from the system, for example at low pressures or under vacuum. Both temperature and pressure be may be adjusted such that water may be removed from the system. Additionally, crosslinking may be induced by chemical reaction. For example, as noted herein above, under certain conditions PFMs may be generated in situ. Whether crosslinking be induced by heat transfer or by chemical reaction, the conditions must be effective to remove water from the system, thereby inducing crosslinking.

For coated abrasive articles and nonwoven abrasive articles, the curing temperature is limited to the temperature that the backing or the fibrous nonwoven substrate can withstand. For example, if the backing contains polyester fibers, the curing temperature will be limited to less than about 200° C.; likewise if the backing contains aramide fibers the curing temperature will be limited to about 300° C. For a metal backing, the curing temperature can be about 250° C. or greater. The rate of curing with any energy source varies with the nature of the composition. Typical curing conditions involve heating the binder compositions for about 15 minutes to about 4 hours at about 150° C. to about 200° C.

In the manufacture of a coated abrasive product, the binder composition can be used as either a backsize coat, a saturant coat, a presize coat, a make coat, a size coat, a supersize coat, or combinations thereof. If the thermosetting binder composition of the invention is not employed in all of these coats, then a conventional binder can be employed. Examples of conventional binder resins include phenolic resins, urea-formaldehyde resins, melamine formaldehyde resins, latices, urethane resins, aminoplast resins, acrylate resins, epoxy resins, isocyanate resins, and mixtures thereof. The binder compositions can also be blended with such conventional resins.

In the manufacture of a nonwoven abrasive, the abrasive grains are first dispersed in a make coat precursor to form an abrasive slurry. The abrasive slurry is applied by spraying into an open porous lofty nonwoven substrate by any conventional coating technique. The make coat precursor is polymerized to form the make coat.

The binder of the invention can also be used in bonded abrasive products. The thermosetting binder serves to bond abrasive grains together to form a shaped mass. In one embodiment, the shaped mass is in the form of a grinding wheel. Bonded abrasive products are typically manufactured by molding process, which process is well known to those skilled in the art.

In another embodiment of the invention, the abrasive article is an open low-density abrasive article, comprising in combination (a) a lofty, open, nonwoven three-dimensional fibrous web comprising a plurality of interentangled randomly-extending polyamide staple fibers including points of intersection and contact between said fibers, said points of intersection and contact between said fibers being bonded together to form a three-dimensionally integrated structure throughout said wed, wherein said fibers have surfaces and a fiber tenacity of less than 5 g/denier; (b) a plurality of abrasive particles dispersed throughout said web and securely adhered to said surface of said fibers; and (c) a cured thermosetting binder composition dispersed throughout said web, said binder composition comprising a poly-functional molecule comprising at least two functional groups selected from the group consisting of carboxyl, anhydride and amine; and a crosslinking agent present in amounts effective to provide crosslinked compositions, said crosslinking agent comprising a single urea group and at least two hydroxyl groups, wherein at least two carbon atoms are disposed between the urea group and each of the hydroxyl groups.

The open low-density abrasive article may optionally contain a modifier comprising a rubber material in an amount effective to substantially prevent chemical degradation of said fibers. Preferably the rubber material is selected from acrylic rubber, natural rubber, polyisoprene and carboxy-modified nitrile rubber.

Such nonwoven abrasive articles may take any of a variety of conventional converted forms such as sheets, blocks, strips, belts, brushes, rotary flaps, discs, or solid or foamed wheels. Especially useful forms are discs, sheets and wheels. These forms are provided by assembling multiple layers of the nonwoven abrasive articles of the invention in a stacked or wound manner in multiple layer form and then consolidating the webs into a laminate useful in grinding, polishing, and finishing, such as used in conjunction with power-driven grinding equipment.

In another embodiment, the prebonded flat stock web is cut into round disc shapes, such as with a die, and the disc shapes are then make and size coated.

The nonwoven abrasive article also can be spirally wound about a core to provide the above-mentioned converted forms. Abrasive articles of larger dimension may be made by the preparation of multi-layer "slabs" or "buns". Uncured or partially cured layers of nonwoven abrasive sheet materials of the invention may be stacked, compressed and fully cured to make a layered composite structure capable of being converted into useful articles of substantial dimensions. Alternatively, ribbons, strips, or elongated segments of the nonwoven abrasive sheet may be spirally wound into a wheel shape while the binder is uncured or partially cured and thereafter fully cured to directly yield an abrasive wheel structure.

In another embodiment of the invention, the thermosetting binder of the invention is useful as a friction material such as an asbestos substitute. Suitable applications include drum linings, disc brake pads, brake shoes, clutch plates, transmission bands, synchronizer rings, friction disks, and brake blocks in drilling rigs. The binders of the invention when cured and combined with abrasive grains exhibit a high friction coefficient, excellent thermal stability, long lifetime, no noise, and reliable strength. Preferably, reinforcing fibers as well as friction and wear modifiers of organic, inorganic and metallic compounds are combined in the binder composition. Typical organic fillers include rubber powder and cashew dust which are used in regulating friction, reduction of brake noise and reliability improvement. Typical inorganic fillers are graphite, $MoS_2$, ferrite, $BaSO_4$, and $Ca(NH_4)_2$ are used in order to improve the lubrication and wear properties at high temperatures (>200° C.). Ceramic materials such as alumina, silica, or mullite are good for high friction coefficient and fade-resistant friction materials. Metallic fillers such as copper, aluminum, zinc and brass are also effective for high temperature wear materials.

The friction material contains a porous fibrous base material formed from an aqueous paper slurry formulation having incorporated therein at least one powdered silicone resin and at least one powdered thermosetting resin. The powdered silicone resin and powdered thermosetting resin being dispersed throughout the fibrous base material such that the friction material exhibits high heat resistance and a substantially uniform coefficient of friction. Various types of fibrous base raw pulp materials are useful such as cotton fibers, glass fibers, carbon fibers and/or aramid floc or fibers which are generally designated as aromatic polycarbonamide materials. It is noted that various paper formulations are useful in the present invention and that other materials can be present in the paper formulations. Useful silicone resins include polydimethylsiloxane such as ER-84002 available from Wacker. It is noted that other silicone resins can be used in the invention.

After the fibrous base material is formed into a friction material, the friction material is heated. The heating cures the thermosetting resin at a temperature of about 200° C. and cures the silicone resin at a temperature of about 400° F. Thereafter, the cured friction material is adhered to a desired substrate such as a clutch plate or brake shoe by suitable means.

In another embodiment, the resin of the invention is useful to bond an aggregate such as foundry sand to form a foundry core or mold as is known in the art, in order to provide easy shakeout. Generally, an aqueous solution of the resin comprising said poly-functional molecule and hydroxyalkylurea crosslinker is mixed with the aggregate.

In another embodiment, the resin of the invention provides an abrasive foam grinding, honing, and buffing material. The resin of the invention is combined with microballoons to produce an abrasive stone pad for use in processing workpiece surfaces such as computer hard disks.

The following nonlimiting examples illustrate further aspects of the invention.

SYNTHESIS OF CROSSLINKING AGENTS

EXAMPLES 1–7

105 g diethanolamine and 60 g urea were charged in a 1 L flask equipped with heating mantle, thermometer and stirrer and allowed to react at 115° C. for 8 hours. A nitrogen purge was used to remove evolving ammonia. The progress of reaction was monitored by amine titration. A clear, hygroscopic liquid was obtained which contained N,N-bis (2-hydroxyethyl)urea, which could be used as a crosslinker without purification.

In a similar manner the following amines were reacted with urea.

| Example | Amine | Wt, g | Urea, g |
|---|---|---|---|
| 2 | ethanolamine | 122 | 60 |
| 3 | diethanolamine | 210 | 60 |
| 4 | ethanolamine | 61 | 60 |
|   | diethanolamine | 105 |  |
| 5 | 3-amino-1-propanol | 150 | 60 |
| 6 | 2-amino-2-ethyl-1,3-propanediol (AEPD) | 119 | 30 |
| 7 | 4-aminobutanol | 12 | 4 |

Additional alkanolamines also may be used and include, without limitation, 2-amino-2-methyl-1,3-propanediol, ris (hydroxymethyl)amino-methane, 2-methyl-3-amino-1-propanol and 2-methylaminoethanol.

EXAMPLE 8

100 g of diethanolamine in 100 g water was neutralized with concentrated hydrochloric acid. 77.2 g potassium cyanate were added and the mixture heated to 90° C. for 2 hours. After cooling to ambient temperature, potassium chloride was precipitated by addition of 200 ml of ethanol. The salt was filtered out and the final product was obtained upon removal of water and ethanol by rotary evaporation. The product was a hygroscopic liquid containing N,N-bis(2-hydroxyethyl)urea, which could be used as a crosslinker without further purification. The product similarly could be obtained using other acids to neutralize the amine, e.g., sulfuric acid, and using other cyanates, e.g., sodium cyanate.

EXAMPLE 9

105 g diethanolamine and 90 g dimethylcarbonate were charged to a flask equipped with a heating mantle, stirrer, and condenser. The flask contents were heated to 80° C. and allowed to stir for 3 hours. Volatile byproducts, e.g. methanol, were removed by vacuum distillation. A mixture containing N,N-bis(2-hydroxyethyl)urea was obtained.

EXAMPLE 10

Using the method of Example 1, the reaction also can be conducted effectively using refluxing water as a means of removing evolved ammonia. 105 g diethanolamine, 25 g water and 60 g urea were charged in a 1 L flask equipped with heating mantle, thermometer and stirrer and allowed to react at 115° C. for 8 hours.

EXAMPLE 11

Using the method of Example 9, 210 g diethanolamine was reacted with 90 g dimethyl carbonate. A mixture was obtained containing tetrakis(2-hydroxyethyl)urea.

EXAMPLE 12

Using the method of Example 9, 122 g ethanolamine was reacted with 90 g dimethyl carbonate. A mixture was obtained containing N,N'-bis(2-hydroxyethyl)urea.

Procedure for Determining Extent of Crosslinking by Measuring Percent Insoluble in Solvent 1. Combine polymer and crosslinker in specified amounts, based on equivalent weights.

2. Cast film in petri dish and dry overnight under ambient conditions.

3. Cut approximately 1 g piece of film and weigh accurately.

4. Put film in weighed 1 oz glass jar and cure according to specified time/temperature schedule. (Usual conditions for 1 g sample of film is 240° C., 10 minutes). Weigh film again.

5. Fill jar with water (or other specified solvent). Cap jar and store overnight under ambient conditions.

6. Filter sample through weighed stainless 200 mesh screen.

7. Dry sample and screen to constant weight. Reweigh for final weight.

8. Calculate percent Insoluble=dried sample weight/cured sample weight×100%.

The following tables set forth crosslinking data for compositions of the present invention and for comparative compositions utilizing both conventional formaldehyde-based crosslinkers and conventional formaldehyde-free crosslinkers.

TABLE 1

HAU Crosslinking of Poly(Acrylic Acid)

| HAU Crosslinker | Water Resistance % Insoluble |
|---|---|
| N,N-bis(2-hydroxyethyl) urea | 100 |
| Tetrakis(2-hydroxyethyl) urea | 47 |
| Tris(2-hydroxyethyl) urea | 85 |
| N,N'-bis(2-hydroxyethyl) urea | 100 |
| N,N'-bis(3-hydroxypropyl) urea | 74 |
| None | 0 |

Polymer: poly(acrylic acid); 60,000 Mw
Cure: 240° C.; 10 minutes
0.8 equivalents crosslinker

TABLE 2

HAU Crosslinking of Carboxylated Polymers

| Polymer | Polymer Form | Crosslinker | % Insoluble | Solvent |
|---|---|---|---|---|
| poly(AA) | Aq Solution | N,N-bis(2-hydroxyethyl)urea | 100 | water |
| Lexorez ™ 1405-65 AF[1] | Aq Solution | N,N-bis(2-hydroxyethyl)urea | 98 | water |
| Kuraray ™ KM 118[2] | Aq Solution | N,N-bis(2-hydroxyethyl)urea | 69 | water |
| VA/AA/Manh 45/35/20 | Aq Solution | N,N-bis(2-hydroxyethyl)urea | 99 | water |

TABLE 2-continued

HAU Crosslinking of Carboxylated Polymers

| Polymer | Polymer Form | Crosslinker | % Insoluble | Solvent |
|---|---|---|---|---|
| E/VA, 2 parts AA | Emulsion | None | 56 | acetone |
| E/VA, 2 parts AA | Emulsion | N,N-bis(2-hydroxyethyl)urea | 91 | acetone |

[1] proprietary COOH-Functionalized Polyester available from Inolex.
[2] carboxylated polyvinyl alcohol available from Kuraray.
Cure: 240° C., 10 minutes
1 equivalent crosslinker

TABLE 3

HAU Crosslinking of Mixtures of Poly(Acrylic Acids) and Non-polymeric Polyacids

| Polyacid | % Insoluble |
|---|---|
| citric acid | 75 |
| 1,2,4-benzene tricarboxylic acid | 89 |
| 1,2,4,5-benzene tetracarboxylic acid | 96 |

Polymer: poly(acrylic acid); 60,000 Mw
Crosslinker: N,N-bis(2-hydroxyethyl)urea
Equivalents: Crosslinker/P(AA)/polyacid 1/1/0.25
Solvent: water

TABLE 4

Color Comparison

Heat Discoloration: 150° C., 30 minutes

| Crosslinking System | As Is | Ammonium Chloride Catalyst | Sodium Bisulfite Catalyst |
|---|---|---|---|
| Poly(acrylic acid) + N,N-bis(2-hydroxyethyl urea) | 2 | | |
| Poly(acrylic acid) + N,N'bis(2-hydroxyethyl urea) | 4 | | |
| **Crosslinker level in above systems approximately 10 times level in systems below to exaggerate color effect | | | |
| EVA + 5 parts NMA | 1 | 3 | |
| DMHEA/HPA | 4* | 10 | 6.5 |

NMA is N metholyl acrylamide
HPA is hydroxypropyl acrylate
DMHEA is N-(2,2-dimethoxy-1-hydroxy)ethyl acrylamide
*not effective without catalyst
Color Rating: 1 = no color, 10 = severe color

TABLE 5

HAU Crosslinkers versus HAA Crosslinkers

| Crosslinker | % Insolubles |
|---|---|
| N,N-bis(2-hydroxyethyl)urea | 92 |
| bis[N,N-di(β-hydroxyethyl)] adipamide [9] | 91 |
| N,N-bis(3-hydroxypropyl adipamide) [9] | 74 |

Solvent: water
Polymer: poly(acrylic acid); 90,000 Mw
Cure: 240° C., 10 minutes
0.8 equivalents crosslinker
[9] HAA crosslinkers prepared according to methods described in U.S. Pat. No. 4,076,917.

TABLE 5a

| Crosslinker | Catalyst | % Insolubles |
|---|---|---|
| N,N-bis(2-hydroxyethyl)urea | yes | 52 |
| N,N-bis(2-hydroxyethyl)urea | no | 42 |
| bis[N,N-di(β-hydroxyethyl)] adipamide | yes | 51 |
| bis[N,N-di(β-hydroxyethyl)] adipamide | no | 3 |
| glycerol | no | 0 |

Solvent: water
Polymer: 60,000 Mw poly(acrylic acid)
Cure: 10 minutes, 150° C. in Al tares
Ratio: 1:0.8:0.08 carboxyl:hydroxyl:catalyst
Catalyst: sodium hypophosphite

TABLE 6

HAU and HAU formed in situ

| Crosslinker | % Insolubles |
|---|---|
| N,N-bis(2-hydroxyethyl)urea | 92 |
| diethanolamine/urea (in situ) | 95 |

Solvent: water
Polymer: poly(acrylic acid); 90,000 Mw
Cure: 240° C., 10 minutes
0.8 equivalents crosslinker

TABLE 7

Evaluation on Glass Substrate

| | Cure | | Wet | % |
|---|---|---|---|---|
| | Time (min) | Temp. (deg C.) | Pickup (%) | Stiff (mgf) | Insoluble |
| N,N-bis(2-hydroxyethyl)urea | 10 | 150 | 21% | 537 | 35.00 |
| | 10 | 250 | 21% | 3342 | 97.00 |
| No Crosslinker | 10 | 150 | 19% | 342 | 2.00 |
| | 10 | 250 | 21% | 2459 | 0.00 |

Polymer: poly(acrylic acid); 60,000 Mw
0.1 Equivalent Crosslinker:
Substrate: Whatman GF/B Glass Fiber Filter paper
Wet Soak: One minute in 0.5% Triton X100
Stiffness data obtained according to TAPPI method T543, pm-84 tested in machine direction with 1.0 × 1.5 inch sample size using a Gurley stiffness tester.

TABLE 7(a)

Evaluation on Cellulosic Substrate

| Crosslinker eq. OH/eq.COOH | Cure Time | Pickup % | TENSILE STRENGTH Dry lb. | Wet lb. | 300° F. lb. |
|---|---|---|---|---|---|
| 0 | 5 min | 21.2 | 20.71 | 4.41 | 13.6 |
| 0 | 10 min | 21.2 | 17.63 | 5.62 | 13.85 |
| 0.1 | 5 min | 20.1 | 32.6 | 10.93 | 20.15 |
| 0.1 | 10 min | 20.1 | 24.36 | 12.29 | 17.57 |
| 0.3 | 5 min | 20.3 | 33.05 | 15.85 | 21.73 |
| 0.3 | 10 min | 20.3 | 26.43 | 16.16 | 18.63 |
| 0.8 | 5 min | 20.7 | 26.99 | 11.83 | 19.63 |
| 0.8 | 10 min | 20.7 | 28.15 | 13.9 | 21.03 |

Polymer: poly(acrylic acid); 60,000 Mw
Cure: 200 C.
Crosslinker: N,N-bis(2-hydroxyethyl)urea
Tensile strength data obtained according to TAPPI method T494, om-88.

TABLE 8

HAU Crosslinking of Polymers Comprising Amine

| Polymer | % Insoluble |
|---|---|
| polyethylenimine | 65 |
| poly(vinyl amine-covinyl alcohol) | 78 |

Cure: 240° C., 10 minutes
Crosslinker: 1 equivalent N,N-bis(2-hydroxyethyl)urea
Solvent: water

TABLE 9

HAU Crosslinking of Non-polymeric Polyacids

| Polyacid | % Insoluble |
|---|---|
| Citric acid monohydrate | 15 |
| 1,2,4-benzenetricarboxylic acid | 15 |
| 1,2,4,5-benzenetetracarboxylic acid | 15 |
| 1,2,3,4-butanetetracarboxylic acid | 90 |

Cure: 240° C. 10 minutes
Crosslinker: 1 equivalent N,N-bis(2-hydroxyethyl)urea
Solvent: water

TABLE 10

Varying Equivalents of Crosslinker

| Crosslinker Equivalents | % Insoluble |
|---|---|
| 1 | 93 |
| 0.5 | 93 |
| 0.25 | 98 |
| 0.1 | 86 |
| 0.05 | 96 |

Polymer: poly(acrylic acid); 90,000 Mw
Cure: 240° C., 10 minutes
Crosslinker: N,N-bis(2-hydroxyethyl)urea
Solvent: water

TABLE 11

Catalyzed Crosslinking

| Catalyst | % Insolubles |
|---|---|
| none | 42 |
| tin (II) oxalate | 100 |
| dibutyltin dilaurate | 99 |
| Tyzor ™ LA[3] | 98 |
| Ludox ™ SK[4] | 89 |
| kaolin clay | 85 |
| tributylamine | 84 |
| tripentylamine | 84 |
| triisobutylamine | 83 |
| sulfamic acid | 81 |
| Ludox ™ TMA[4] | 80 |
| Polycat DBU[5] | 79 |
| Zinplex 15[6] | 79 |
| DABCO[7] | 78 |
| boric acid | 78 |
| tin (II) chloride | 74 |
| tetrabutylammonium hydroxide | 72 |
| DABCO-T[8] | 71 |
| N-butyl morpholine | 68 |
| aluminum lactate | 66 |
| sodium metabisulfite | 64 |
| sodium hypophosphite | 52 |

Polymer: 60,000 Mw poly(acrylic acid)
Cure: 10 minutes, 150° C. in Al tares
Ratio: 1:0.8:0.08 carboxyl:hydroxyl:catalyst
Crosslinker: N,N-bis(2-hydroxyethyl)urea
Solvent: water
[3]Ammonium salt of lactic acid chelate of titanium available from E.I. duPont & Nemours.
[4]Colloidal silica available from E.I. duPont & Nemours.
[5]Diazabicyclo undecane available from Air Products.
[6]Proprietary zinc catalyst available from Ultra Additives.
[7]Diazabicyclo octane available from Air Products.
[8]2-(2-dimethyl amino ethyl)methylamino)ethanol available from Air Products.

What is claimed is:

1. An abrasive article comprising:

(a) a plurality of abrasive grains; and (b) at least one binder for the abrasive grains, wherein said binder comprises a cured composition consisting essentially of a poly-functional molecule comprising at least two functional groups selected from the group consisting of carboxyl, anhydride and amine; and a crosslinking agent present in amounts effective to provide crosslinked compositions, said crosslinking agent comprising a single urea group and at least two hydroxyl groups, wherein at least two carbon atoms are disposed between the urea group and each of the hydroxyl groups.

2. The abrasive article according to claim 1 wherein the ratio of the sum total number of equivalents of functional groups contained in the poly-functional molecule to the number of equivalents of hydroxyl groups contained in the crosslinking agent ranges from about 1:1 to about 100:1.

3. The abrasive article according to claim 1 wherein the ratio of the sum total number of equivalents of functional groups contained in the poly-functional molecule to the total number of equivalents of hydroxyl groups contained in the crosslinking agent ranges from about 5:4 to about 10:1.

4. The abrasive article according to claim 1 wherein the crosslinking agent is represented by Structure (I)

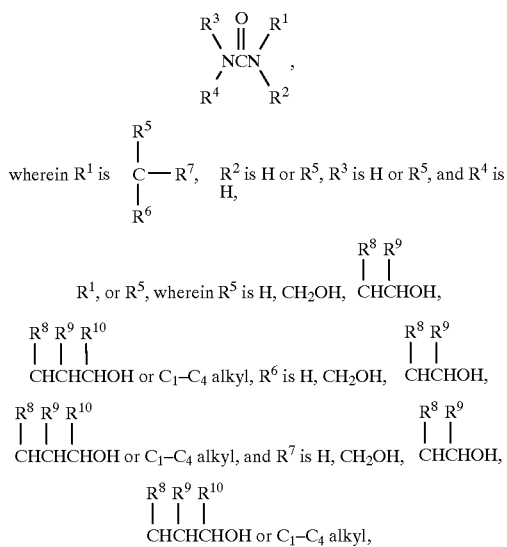

wherein $R^8$ is H, methyl or ethyl, $R^9$ is H, methyl or ethyl, and $R^{10}$ is H, methyl or ethyl.

5. The abrasive article according to claim 1 wherein said crosslinking agent is selected from the group consisting of N,N-bis(2-hydroxyethyl)urea, tetrakis(2-hydroxyethyl)urea, tris(2-hydroxyethyl)urea, N,N'-bis(2-hydroxyethyl)urea, N,N'-bis(3-hydroxypropyl)urea, N,N'-bis(4-hydroxybutyl)urea and 2-urea-2-ethyl-1,3-propanediol.

6. The abrasive article according to claim 1 wherein said binder composition further comprises a catalyst.

7. The abrasive article according to claim 6 wherein said catalyst is selected from the group consisting of Lewis acids, Lewis bases, and combinations thereof.

8. The abrasive article according to claim 1 wherein said binder composition further comprises an additive selected from the group consisting of fillers, grinding aids, and mixtures thereof.

9. The abrasive article according to claim 1 wherein said abrasive article comprises a bonded abrasive article.

10. A bonded abrasive article comprising a plurality of abrasive grains bonded together by a binder to form a shaped mass, wherein said binder comprises a cured composition consisting essentially of a poly-functional molecule comprising at least two functional groups selected from the group consisting of carboxyl, anhydride and amine; and a crosslinking agent present in amounts effective to provide crosslinked compositions, said crosslinking agent comprising a single urea group and at least two hydroxyl groups, wherein at least two carbon atoms are disposed between the urea group and each of the hydroxyl groups.

11. A casting core composition comprising:

(a) refractory grains; and (b) at least one binder for the refractory grains, wherein said binder comprises a cured composition consisting essentially of a poly-functional molecule comprising at least two functional groups selected from the group consisting of carboxyl, anhydride and amine; and a crosslinking agent present in amounts effective to provide crosslinked compositions, said crosslinking agent comprising a single urea group and at least two hydroxyl groups, wherein at least two carbon atoms are disposed between the urea group and each of the hydroxyl groups.

* * * * *